Figure 1:
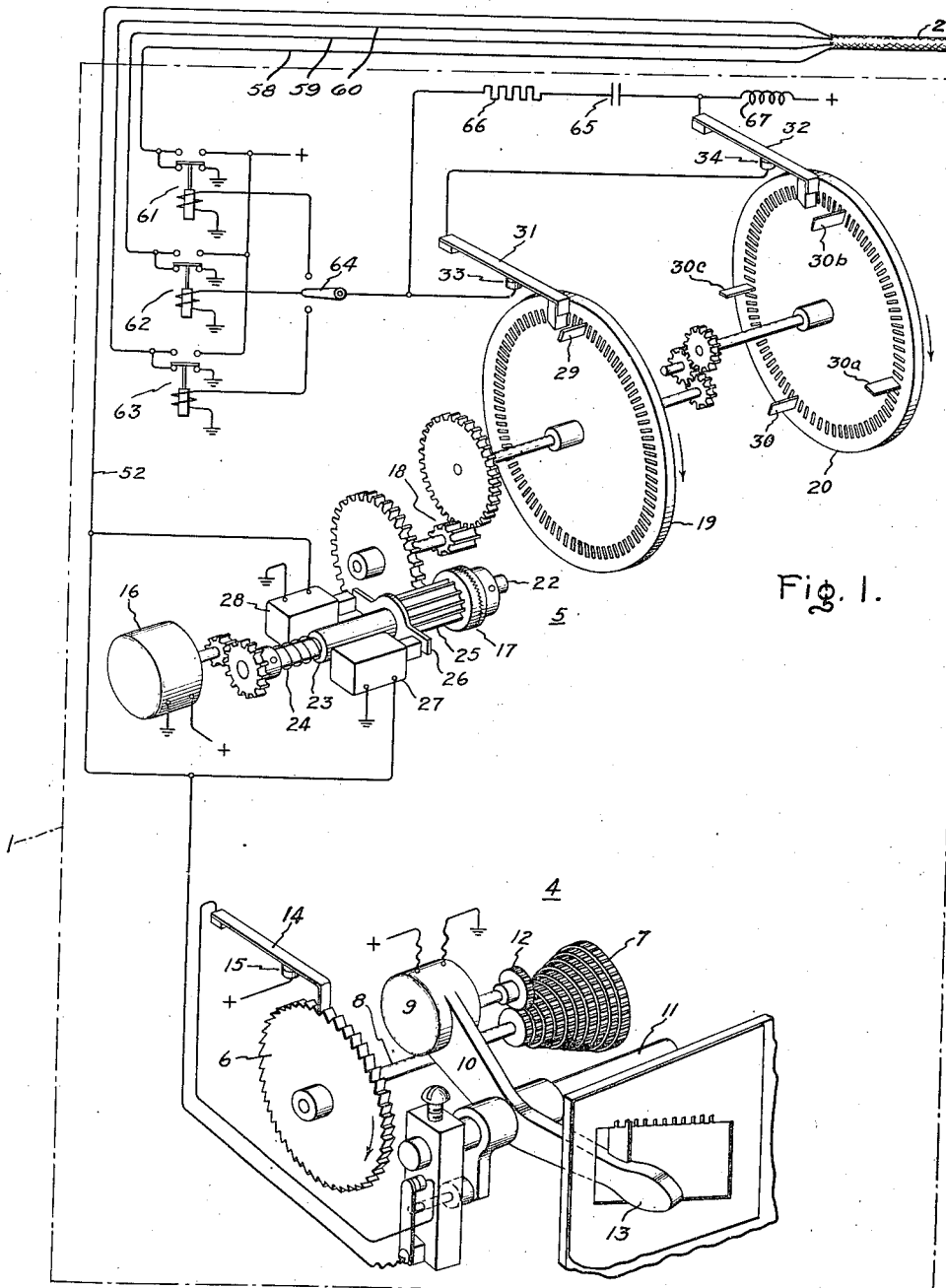

March 22, 1949.  W. C. PENNELL  2,465,115
TRAFFIC CONTROL SYSTEM
Filed Feb. 23, 1946  3 Sheets-Sheet 1

Inventor:
William C. Pennell,
by Claude H. Mott.
His Attorney.

March 22, 1949.　　　　　W. C. PENNELL　　　　2,465,115
TRAFFIC CONTROL SYSTEM
Filed Feb. 23, 1946　　　　　　　　　　　　3 Sheets-Sheet 3
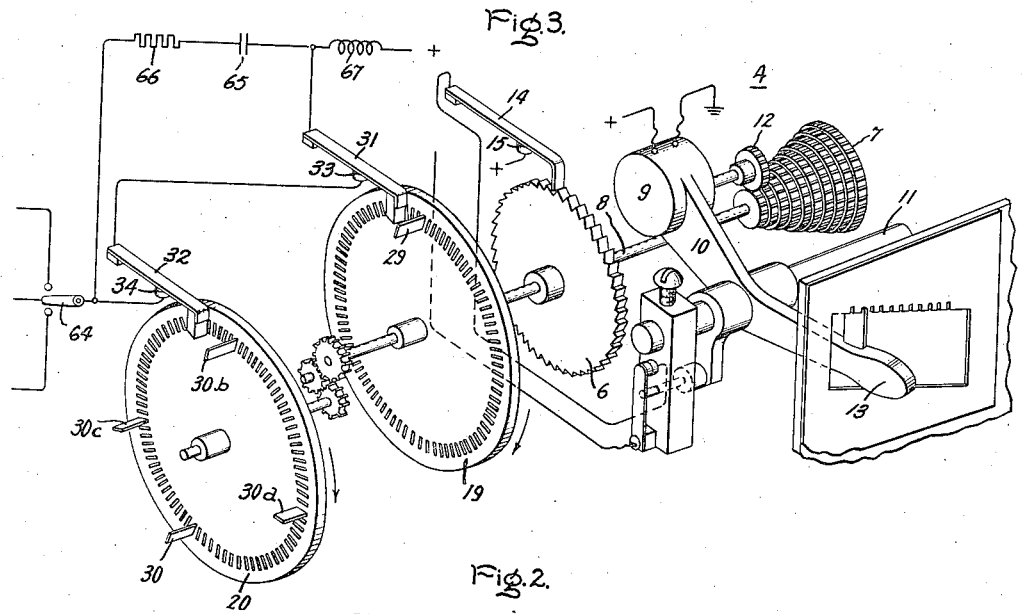
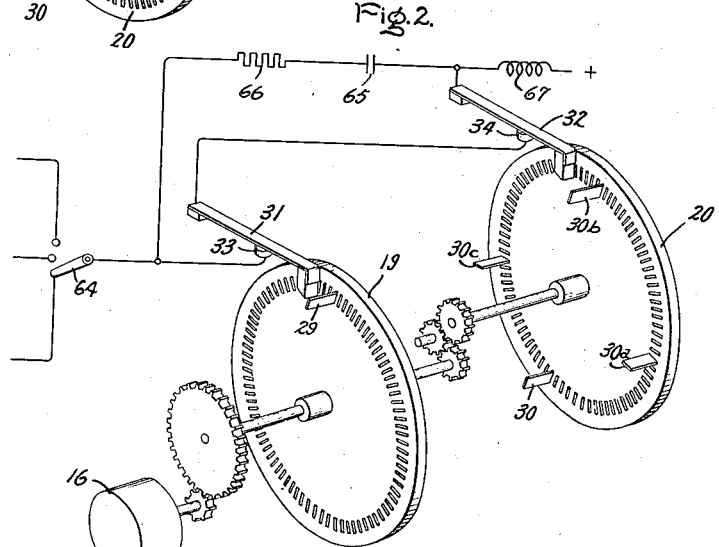
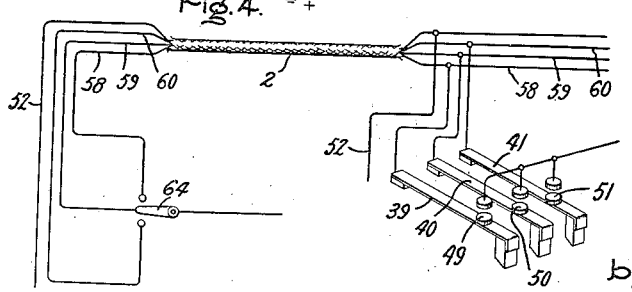
Inventor:
William C. Pennell,
by Claude H. Mott.
His Attorney.

Patented Mar. 22, 1949

2,465,115

UNITED STATES PATENT OFFICE 2,465,115

TRAFFIC CONTROL SYSTEM

William C. Pennell, Saugus, Mass., assignor to General Electric Company, a corporation of New York Application February 23, 1946, Serial No. 649,612

8 Claims. (Cl. 177—337)

My invention relates to traffic signal control systems and more particularly to systems wherein one or more secondary or intersection controllers are brought into and maintained in synchronism with a master controller.

In systems of the above type, it is common to provide synchronizing means operable at a predetermined instant during each cycle of the secondary controller to stop the secondary controller in the event that a predetermined synchronous positional relation between the secondary controller and the master controller does not exist. Ordinarily, the synchronizing means maintains the secondary controller at standstill until the master and secondary controllers again assume the desired synchronous relationship, whereupon the secondary controller is released and synchronous operation continued. When the synchronizing means is thus rendered operable once per cycle of the controllers, it is possible, under certain conditions of a synchronous operation, that the resynchronizing interval may extend over almost one complete cycle of the master controller. During the resynchronizing interval, the secondary controller being resynchronized is at standstill, so that the signal lights remain fixed in one signalling condition. Under certain traffic conditions, it is undesirable to hold up the traffic on any one street for such an extended period.

Accordingly, therefore, means have heretofore been devised for automatically interrupting the resynchronizing interval prior to its normal termination and separating it into a number of shorter intervals. One such means is known as a reset interrupter which, in operation, disables the synchronizing means a predetermined time after the initiation of a resynchronizing interval thereby to allow the secondary controller to resume operation. If after such release the secondary controller is still not fully synchronized, it will initiate another partial resynchronizing interval after one cycle of operation.

It is a general object of my invention to provide new and improved reset interrupting means for a synchronized system of traffic signal controllers.

It is a further object of my invention to provide a reset interrupter which is equally applicable both to synchronizing systems wherein the interconnecting circuit normally carries current and to systems wherein the interconnecting circuit normally carries no current.

It is still a further object of my invention to provide reset interrupting means for a synchronized system of traffic controller which requires a minimum of additional apparatus, is inexpensive, simple to install, and reliable in operation.

Figure 1A:
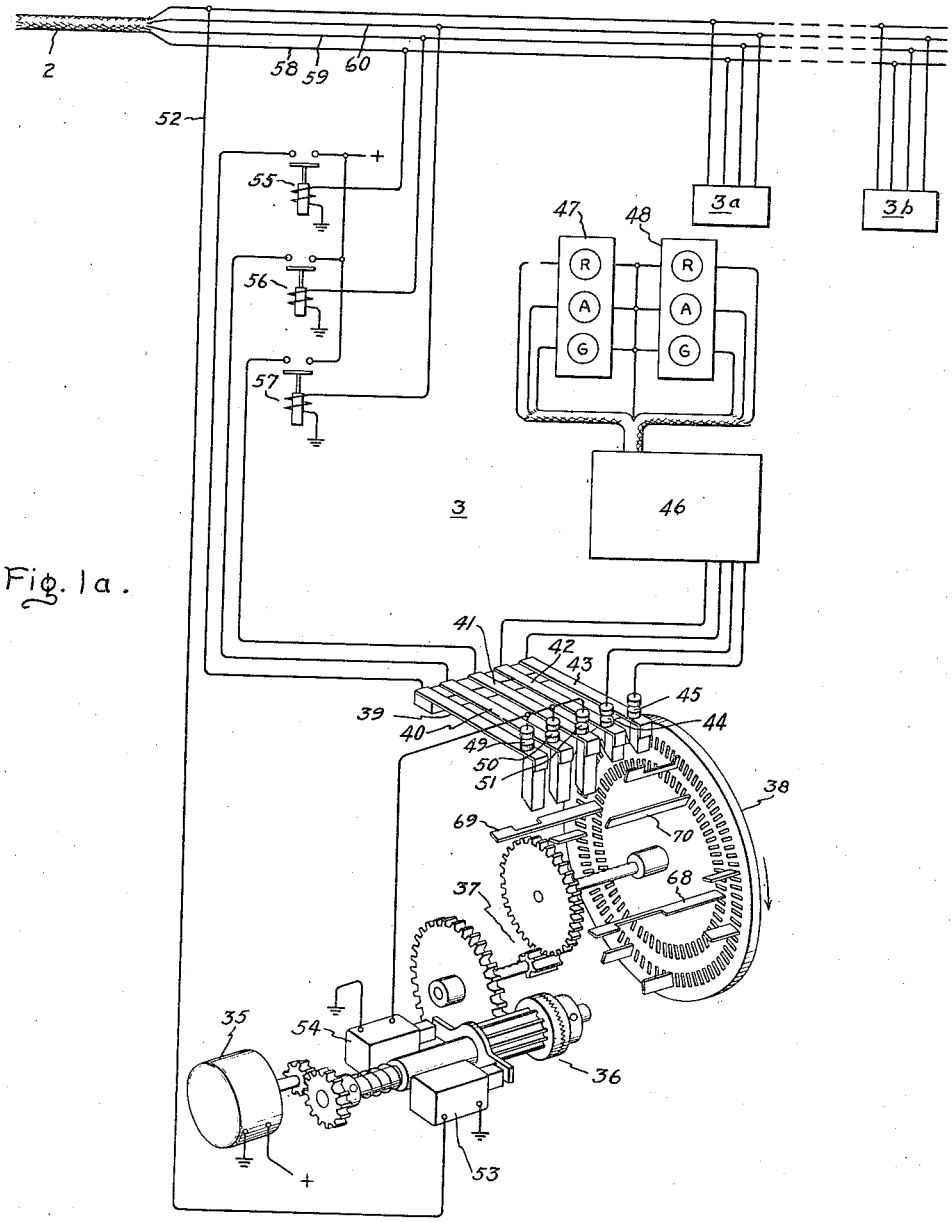

My invention will be more fully understood and its objects and advantages further appreciated by referring now to the following detailed specification taken in connection with the accompanying drawing, Figs. 1 and 1a of which, taken together, illustrate diagrammatically a traffic signal control system embodying my invention. Figs. 2, 3 and 4 are fragmentary diagrams of modified master controllers which, taken in conjunction with Figs. 1 and 1a, illustrate other embodiments of my invention.

Referring now to the drawing in detail, the system there shown comprises a master controller 1 (Fig. 1) connected through an interconnecting cable 2 to a plurality of secondary or intersection controllers 3, 3a, and 3b (Fig. 1a). For the purpose of illustration, only the intersection controller 3 has been shown in detail, the identical controllers 3a and 3b being indicated in block form only. As the description proceeds, it will be evident that any desired number of intersection controllers, one or more, may be used.

The master controller 1 comprises a master timer 4 and a synchronizer 5. The master timer comprises a cycle time control cam 6 and a gear cone 7 mounted upon a rotatable shaft 8 and arranged to be driven at any one of a plurality of selectable speeds by a synchronous timing motor 9. The motor 9 is carried at the end of an arm 10 which is rotatably and slidably mounted upon a fixed stud 11. The shaft of the motor 9 carries a pinion 12 which is selectably engageable with the gears of the gear cone 7. A handle 13 is provided for adjustably positioning the motor 9 and its connected pinion 12 with respect to the gear cone. The cam 6 is formed to provide at its periphery a cam surface generally in the form of teeth. This cam surface cooperates with a contact arm 14 to open a pair of normally closed contacts 15 a predetermined number of times during each revolution of the cam 6. A master timer of similar construction is described in Patent 2,328,473—Leonard.

The master controller 1 includes also the synchronizer 5, which comprises a timing motor 16 connected through a pair of normally engaged clutch members 17 and suitable gearing 18 to drive a pair of contact actuating timing dials 19 and 20. The dials 19 and 20 are not on the same shaft, but are connected through suitable gearing 21 so that the dial 20 rotates at a speed which differs slightly from the speed of the dial 19. The dial 20 may rotate either faster or slower than the dial 19, but should not rotate at precisely the same speed. More generally, the ratio of the cycle times of the dials 19 and 20 should not be exactly divisible by the inverse of the number of contact actuating elements on the dial 20. The reason for this asynchronous relationship of the dials 19 and 20 will appear more fully hereinafter.

The clutch and gear connection between the motor 16 and the dial 19 is described in detail and claimed in the foregoing Leonard Patent No. 2,328,473. Briefly, the clutch comprises a pair of clutch disks 17 having serrated faces and mounted, respectively, upon a motor driven shaft 22 and a sleeve 23 loosely carried by the shaft 22. A helical compression spring 24 bearing against one end of the sleeve 23 normally maintains the clutch disks in engagement. The sleeve 23 has a portion 25 formed as a driving pinion in the gear train 18. Magnetic means are provided for disengaging the clutch members 17. For this purpose, the sleeve 23 carries, adjacent the pinion 25, a diametrical bar 26 of magnetizable material positioned for cooperation with a pair of electromagnets 27 and 28. The magnets 27 and 28 are positioned on diametrically opposite sides of the clutch shaft 22 so that, when either one or both of the magnets is energized, the armature 26 will be attracted to disengage the clutch disks 17. It will be noted that, by reason of the diametrical bar formation of the armature 26, it can be attracted into engagement with the magnet pole faces only in two positions during its revolution when it lies directly across the pole faces as shown on the drawing. If the armature lies in any other position when the magnets are energized, it will not be attracted toward the magnets until its rotation next brings it into the diametric position shown.

Each of the timing dials 19 and 20 is provided with a circumferential row of slots arranged to carry one or more contact actuating keys. The dial 19 is shown carrying a single key 29; and the dial 20 is shown carrying four substantially equally spaced keys 30, 30a, 30b, and 30c. A pair of resilient contact arms 31 and 32 are positioned adjacent the dials 19 and 20, respectively, for cooperation with the respective actuating keys. The contact arm 31 is arranged when lifted by the key 29 to open a pair of normally closed contacts 33. The contact arm 32 is arranged when raised by one of the keys in the dial 20 to open a pair of normally closed contacts 34.

The secondary controller 3 comprises a timing motor 35 connected through a normally engaged clutch 36 and suitable gearing 37 to drive a timing dial 38. The magnetic actuating mechanism for the normally engaged clutch 36 is similar to that described in connection with the synchronizer 5 of the master controller. The timing dial 38 is provided with two concentric rows of slots, each row being provided with a separate group of contact actuating keys. Adjacent the dial 38 there are provided five resilient contact arms 39, 40, 41, 42, and 43. The contact arms 42 and 43 are arranged, when lifted by certain of the keys in the outer row of slots, to close respective pairs of normally open contacts 44 and 45. The contacts 44 and 45 control a switching mechanism 46, which is, in turn, arranged to control the various lighting circuits of two groups of traffic signals 47 and 48. The contact arms 39, 40, and 41 are arranged, when raised by certain keys in the inner row of slots on the dial 38, to close respective pairs of normally open contacts 49, 50, and 51. The contacts 49, 50, and 51 are connected in a synchronizing circuit to be described hereinafter.

The secondary controller 3 is described in greater detail and claimed in the foregoing Leonard Patent 2,328,473. As illustrated in that patent, the switching mechanism 46 may suitably comprise a solenoid actuated drum switch rotated in a step by step fashion upon recurrent closure of the secondary timing contacts 44 and 45.

Referring now more particularly to the circuit connections of the master and intersection controllers described above, it will be observed that the clutch magnets 27 and 28 of the synchronizer 5 are connected in parallel circuit relation with each other and to a suitable source of electric current supply (+) through the normally closed master timer contacts 15. Through a wire 52 in the interconnecting cable 2 the clutch magnet 53 of the intersection controller 3 is also connected in parallel circuit relation with the synchronizer magnets 27 and 28. Through this circuit, the synchronizer magnets 27 and 28 and the secondary controller magnet 53 are recurrently energized and deenergized a predetermined number of times each cycle by operation of the master timer cam 6 and the contacts 15. By thus recurrently impulsing the clutch magnets of the synchronizer 5 and the secondary controller 3, the synchronizer dials 19 and 20 and the secondary timer dial 38 may be delayed and their cycle times controlled in accordance with the speed of rotation of the master timing cam 6. This remote cycle change operation is fully described and claimed in the foregoing Leonard Patent No. 2,328,473.

It will be particularly observed that, by the foregoing cycle control arrangement including the master timer cam 6, the synchronizer dial 19 is maintained in synchronism with the master timer cam 6 at any selected speed of the cam 6.

Means are also provided for synchronously maintaining the secondary controller 3 in a predetermined desired phase position with respect to the synchronizer dial 19. For this purpose, I provide a synchronizing circuit operable once per cycle of the secondary timer to check the synchronous positional relationship of the secondary timer and the synchronizer. Briefly, this circuit comprises the clutch magnet 54 of the secondary timer 3 and means for connecting the magnet to a suitable source of electric power supply (+) through a selected one of the secondary dial contacts 49, 50, 51 and the contacts of one of a group of secondary synchronizing relays 55, 56, 57 controlled by the master controller 1.

The relays 55, 56, and 57 are selectably energized through interconnecting wires 58, 59, and 60, respectively, in the cable 2 and through the normally open contacts of a group of master synchronizing relays 61, 62, and 63, respectively. The energizing coils of the master synchronizing relays 61, 62, and 63 are selectably energized through a selector switch 64 and the synchronizer dial contacts 33 and 34 in series circuit relation. The energizing circuits for the relays 61, 62, 63 include also a spark eliminating capacitor 65 connected in series with a resistor 66 across the dial contacts 33 and 34, and a serially connected choke coil 67. The master synchronizing relays 61, 62, and 63 are also each provided with a pair of normally closed contacts connected to short-circuit the actuating windings of the secondary synchronizing relays 55, 56, and 57, respectively.

The energizing circuit of the selected master synchronizing relay 61, 62, 63 is interrupted once per cycle of the master controller by action of the normally closed dial contacts 33 and the dial key 29. This energizing circuit is also interrupted four times per cycle of the master controller and in an asynchronous manner by the action of the dial contact 34 and the keys 30, 30a, 30b and 30c.

Referring now to the secondary timing dial 38 and the synchronizing dial contacts 49, 50, and 51, it will be observed that each of the contacts 49, 50 and 51 is arranged to be closed once per revolution of the dial 38 but at spaced apart instants of the cycle. The contacts 49 are closed by engagement of a dial key 68 in the inner row of slots of the dial 38 with an insulating projection on the end of the contact arm 39. Similarly, the contacts 50 and 51 are closed once per revolution of the dial 38 by keys 69 and 70, respectively, located in the inner row of slots of the dial 38, but displaced in position with respect to each other and key 68.

In operation, a selected one of the master synchronizing relays, for example the relay 62, is normally energized through the selector switch 64 and the normally closed synchronizer dial contacts 33 and 34. In its energized position, the relay 62 applies power to the interconnecting cable 59, thereby to energize the secondary synchronizing relay 56, so that the relay 56 also is normally picked up. The contacts of the relay 56 are in series circuit relation with the normally open dial synchronizing contacts 50, so that normally the clutch magnet 54 remains deenergized. Once per revolution of the dial 38, however, the contact 50 is closed by the dial key 69, thereby to render the synchronizing circuit operable to energize the magnet 54 if the relay 56 remains picked up. However, if the secondary timing dial 38 is operating in the desired synchronous positional relationship with the synchronizer dial 19, the relay 56 is momentarily dropped out by the synchronizer at the same instant when the dial contact 50 is closed, so that the clutch magnet 54 remains deenergized and the rotation of the timing dial 38 is not disturbed. This action is accomplished by the key 29 in the synchronizer dial 19 which, when the proper synchronous relationship obtains, opens the contacts 33 of the synchronizer at the same time that the contact 50 of the secondary controller is closed. When the contact 33 is opened, the energizing circuit for the master synchronizing relay 62 is interrupted, so that the relay 62 drops out and deenergizes the secondary synchronizing relay 56. Thus, if the secondary timer is operating in the desired synchronous positional relationship with the master timer, the dial contact 50 is closed and the contacts of the synchronizing relay 56 are simultaneously opened once per revolution of the secondary dial 38.

If, however, the secondary dial 38 is displaced in phase with respect to the synchronizer dial 19, the relay 56 will not be dropped out by the synchronizer at the same instant when the secondary dial contacts 50 are closed. The clutch magnet 54 will then be energized and will disengage the clutch disks 36 and stop the secondary dial 38 until such time as the synchronizer relay 56 is next dropped out by the master controller. In the absence of the interrupter dial 20 and the contacts 34, such resumption of secondary timer operation would occur only upon opening of the switch 33 by the synchronizer dial key 29, that is, upon completion of resynchronization.

In accordance with my invention, however, the master synchronizing relay 62 is recurrently deenergized a plurality of times per cycle in an asynchronous manner, thereby recurrently to deenergize the secondary synchronizing relay 56. This asynchronous interrupting action is effected by the interrupter contact 34 and the interrupter dial 20. In this manner, the resynchronizing interval, if sufficiently long, is prematurely interrupted at least within a fourth of a revolution of the interrupter dial 20. It will be evident that, if the secondary timer dial 38 is thus released before complete resynchronization, a second partial resynchronizing action will be initiated after one cycle of operation of the secondary timer.

More specifically, let it be assumed that in operation the various dials are in the relative positions shown and are rotating in a clockwise direction as viewed in the drawing. With the selector switch 64 in the position shown, the synchronizing circuit comprises the relays 62 and 56 and the secondary dial contact 50 actuated by the dial key 69. It is evident, by comparing the position of the key 69 in the dial 38 with that of the key 29 in the dial 19, that the secondary timer is out of synchronism with the master timer. Thus, when the key 69 next closes the contact 50, the reset magnet 54 of the secondary timer clutch will be energized through the contacts of the relay 56 and the contact 50. The relay 56 is normally picked up through the master relay 62 which, in turn, is normally energized through the synchronizer dial contacts 33 and 34.

If, now, the interrupter contacts 34 were not in circuit with the synchronizing contacts 33, the secondary timer dial 38 would remain at standstill until the key 29 next opened the contacts 33. Under the phase conditions assumed, this total resynchronizing time would be more than three-quarters of a revolution of the dial 19.

However, with the contacts 34 in series circuit relation with the contacts 33 in accordance with my invention, the energizing circuit for the relay 62 will be disabled prior to full resynchronization by action of the next interrupter key, for example the key 30, in opening the contacts 34. When the contacts 34 are opened, the relay 62 is dropped out. The relay 62 in dropping out deenergizes the relay 56, so that the energizing circuit of the clutch magnet 54 is interrupted. The secondary timer is therefore again set in operation and makes one complete revolution. Since the previous partial resynchronizing interval was not sufficient to fully restore the desired positional relationship of the dials 19 and 38, the contacts 50, when next closed by the dial key 69, will again complete an energizing circuit for the magnet 54 and stop the dial 38. The dial 38 again remains at standstill only until the next interrupter key, for example the key 30a, opens the contact 34.

It is evident that the foregoing intermittent partial resynchronization will continue until one of the successive partial resynchronizing intervals is terminated by the key 29 in the dial 19, rather than by one of the interrupter keys on the dial 20. At this point, resynchronization is completed and synchronous operation continues under the joint control of the contacts 33 of the synchronizer and the reset contacts 50 of the secondary timer. In this normal synchronizing action, the interrupter dial 20 and the contacts 34 have no effect.

It will now be evident from the foregoing description of the operation with the selector switch 64 in the position shown, that when the selector switch is in either of its other positions the synchronizing action is similar in all respects except that the dial 38 is synchronized with the dial 19 in different phase or positional relationships. If the master relay 61 is selected for energization, the secondary relay 55 and secondary dial contacts 49 are operable, so that the secondary dial key 68 is synchronized with the master dial key 29. Similarly, if the master relay 63 is selected, the secondary relay 57 and the dial contacts 51 are operable, the dial key 70 then determining the desired synchronous positional relation of the dial 38 with the dial 19.

The reason for operating the dials 19 and 20 of the synchronizer in an asynchronous manner will now be apparent. It is clear from the foregoing description that, if the dials 19 and 20 rotated at precisely the same speed or if their speed ratio were exactly divisible by the inverse of the number of keys in the dial 20, the first of the interrupter key on the dial 20 which opened the contacts 34 after initiation of resynchronization would remain in step with the selected secondary reset key, for example the key 69 on the dial 38. Therefore, the dial 38 would synchronize with this first interrupter key, rather than with the key 29 on the synchronizer dial 19. By causing the dial 20 to rotate either faster or slower than the dial 19, this first interrupter key will not be in a position to synchronize with the secondary reset key upon completion of the first revolution of the secondary timer following the initial partial reset interval.

It is to be noted that, if desired, the synchronizer dial 19 and the synchronizer contact 33 could be incorporated as a part of the master timing device 4 rather than a part of the synchronizer 5, in the manner shown in the foregoing Leonard Patent 2,328,473. Accordingly, therefore, if desired, the master timer device 4 and the synchronizer clutch 17 could be omitted, the master controller then consisting of the master relays and the dials 19 and 20 positively driven by the motor 16, as illustrated at Fig. 2. Moreover, in the form of the invention shown at Figs. 1 and 1a, the master timing device 4 and the synchronizing clutch 17 between the motor and the dials of the synchronizer 5 have been included only for the purpose of providing speed or cycle time control of the synchronizer 5 and the secondary timers. Obviously also, cycle time control may be provided by connecting the dial 19 to be driven directly by the shaft 8 of the master timer 4 and gearing the dial 20 to be driven from the shaft 8 in an asynchronous manner, the remainder of the synchronizer 5 being omitted, as illustrated at Fig. 3. The systems of Figs. 2 and 3 are otherwise the same as that illustrated at Figs. 1 and 1a.

It will now be evident also to those skilled in the art that, if desired, the banks of synchronizing relays 61—63 and 55—57 at the master and secondary controllers may be omitted, the selector switch 64 then connecting directly to a selected one of the interconnecting wires 58, 59 or 60, and these wires being connected directly to the secondary dial contacts 49, 50 and 51, respectively, as shown at Fig. 4. In this event the interconnecting wires would normally carry no current, rather than being normally energized as shown. The system of Fig. 4 is otherwise the same as that illustrated at Figs. 1 and 1a.

While I have described in detail only a preferred embodiment of my invention by way of illustration, many other modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. In a traffic signal control system, master and secondary timing elements having the same predetermined normal cycle time, synchronizing means for delaying said secondary timing element, means controlled by said master timing element for momentarily disabling said synchronizing means once per cycle, and timing means continuously operable recurrently to disable said synchronizing means a plurality of times per cycle.

2. In a traffic signal control system, master and secondary timing elements having the same predetermined normal cycle time, synchronizing means for delaying said secondary timing element, means controlled by said secondary timing element for momentarily rendering said synchronizing means operable once per cycle, means controlled by said master timing element for momentarily disabling said synchronizing means once per cycle, and additional means for asynchronously disabling said synchronizing means a plurality of times per cycle, the ratio of the cycle times of said master timing element and said additional means being a non-integral multiple of the inverse of the number of asynchronous disabling operations per cycle.

3. In a traffic signal control system, master and secondary timing elements having the same predetermined normal cycle time, synchronizing means rendered operable by said secondary timing element to delay said secondary timing element unless a predetermined synchronous positional relationship exists between said master and secondary timing elements, and timing means continuously operable asynchronously with respect to said master timing element and arranged recurrently to disable said synchronizing means a plurality of times per cycle, the ratio of the cycle times of said master timing element and said timing means being a non-integral multiple of the inverse of the number of asynchronous disabling operations per cycle.

4. In a traffic signal control system, master and secondary timing elements having the same predetermined normal cycle time, synchronizing means rendered operable by said secondary timing element to delay said secondary timing element unless a predetermined synchronous positional relationship exists between said master and secondary timing elements, said synchronizing means including a circuit interrupted once per cycle by said master timing element, and timing means continuously driven asynchronously with respect to said master timing element and arranged recurrently to interrupt said circuit a plurality of times per cycle, the ratio of the cycle times of said master timing element and said timing means being a non-integral multiple of the inverse of the number of asynchronous interruptions per cycle.

5. In a traffic signal control system, master and secondary timing elements having the same predetermined normal cycle time, means including a synchronizing circuit controlled by said secondary timing element to stop said secondary element at a predetermined instant once per cycle, means actuated by said master timing element for disabling said synchronizing circuit at a predetermined instant once per cycle thereby to release said secondary timing element, said predetermined instants coinciding whenever said timing elements are in a predetermined synchronous positional relationship, and continuously operating means for asynchronously disabling said synchronizing circuit a plurality of times per cycle, the ratio of the cycle times of said master timing element and said continuously operating means being a non-integral multiple of the inverse of the number of asynchronous disabling operations per cycle.

6. In a traffic signal control system, master and secondary timing elements having the same predetermined normal cycle time, means for stopping said secondary timing element including a synchronizing circuit interconnecting said timing elements and having a pair of normally closed contacts and a pair of normally open contacts in series circuit relation, means actuated by said secondary timing element to close said normally open contacts momentarily at a predetermined instant once per cycle thereby to stop said secondary timing element, means actuated by said master timing element to open said normally closed contacts momentarily at a predetermined instant once per cycle thereby to release said secondary timing element, said predetermined instants coinciding whenever a predetermined synchronous positional relationship exists between said master and secondary timing elements, and additional timing means for recurrently and asynchronously interrupting said synchronizing circuit a plurality of times per cycle, the ratio of the cycle times of said master timing element and said additional timing means being a non-integral multiple of the inverse of the number of asynchronous interruptions per cycle.

7. In a traffic signal control system, a master controller including a timing element having a predetermined normal cycle time, a secondary controller including a timing element having the same normal cycle time, means in said secondary controller for stopping said secondary timing element and including a synchronizing circuit having two pairs of normally open contacts in series circuit relation, means in said master controller for normally maintaining one said pair of normally open contacts closed and including a timing circuit having two pairs of normally closed contacts in series circuit relation, means actuated by said secondary timing element to close the other said pair of normally open contacts at a predetermined instant once per cycle thereby to stop said secondary timing element, means actuated by said master timing element to open one said pair of normally closed contacts at a predetermined instant once per cycle thereby to release said secondary timing element, said predetermined instants coinciding whenever a predetermined synchronous positional relationship exists between said master and secondary timing elements, and asynchronous timing means in said master controller for recurrently opening the other said pair of normally closed contacts a plurality of times per cycle, the ratio of the cycle times of said master timing element and said asynchronous timing means being a non-integral multiple of the inverse of the number of asynchronous contact openings per cycle.

8. In a traffic signal control system, a master controller including a timing element having a predetermined normal cycle time, a secondary controller including a timing element having the same normal cycle time, means in said secondary controller for delaying said secondary timing element and including a synchronizing circuit having a pair of normally open contacts, means actuated by said secondary timing element to close said normally open contacts momentarily at a predetermined instant once per cycle, means controlled by said master timing element for disabling said synchronizing circuit momentarily once per cycle, and asynchronous timing means continuously operable to disable said synchronizing circuit a plurality of times per cycle, the ratio of the cycle times of said master timing element and said asynchronous timing means being a non-integral multiple of the inverse of the number of asynchronous disabling operations per cycle.

WILLIAM C. PENNELL.

REFERENCES CITED

The following references are of record in the file of this patent:

UNITED STATES PATENTS

| Number | Name | Date |
|---|---|---|
| 360,986 | Beale | Apr. 12, 1887 |
| 1,496,875 | Field | June 10, 1924 |
| 2,236,298 | Reid | Mar. 25, 1941 |
| 2,328,473 | Leonard | Aug. 31, 1943 |
| 2,369,588 | MacAllister | Feb. 13, 1945 |